US008484389B2

(12) United States Patent
Bhattacharya

(10) Patent No.: US 8,484,389 B2
(45) Date of Patent: Jul. 9, 2013

(54) AV RENDERER PERIPHERAL WITH DUAL INERRUPT LINES FOR STAGGERED INTERRUPTS

(75) Inventor: Puranjoy Bhattacharya, Bangalore (IN)

(73) Assignee: Entropic Communications, Inc., San Diego, CA (US)

( * ) Notice: Subject to any disclaimer, the term of this patent is extended or adjusted under 35 U.S.C. 154(b) by 1176 days.

(21) Appl. No.: 12/158,995

(22) PCT Filed: Dec. 21, 2006

(86) PCT No.: PCT/IB2006/055012
§ 371 (c)(1),
(2), (4) Date: Jul. 9, 2008

(87) PCT Pub. No.: WO2007/072457
PCT Pub. Date: Jun. 28, 2007

(65) Prior Publication Data
US 2008/0317119 A1    Dec. 25, 2008

Related U.S. Application Data

(63) Continuation of application No. 60/753,850, filed on Dec. 23, 2005.

(51) Int. Cl.
G06F 13/24 (2006.01)
G06F 13/26 (2006.01)
G06F 3/00 (2006.01)
H04L 5/00 (2006.01)
H04L 7/00 (2006.01)

(52) U.S. Cl.
USPC ............. 710/48; 710/260; 710/261; 710/262; 710/263; 710/264; 710/265; 710/266; 713/375; 713/400; 713/401; 713/500; 713/502; 713/600

(58) Field of Classification Search
USPC ................... 710/48, 260–266; 713/375, 400, 713/401, 500, 502, 600
See application file for complete search history.

(56) References Cited

U.S. PATENT DOCUMENTS 4,351,025 A * 9/1982 Hall, Jr. .......................... 703/21
4,417,302 A * 11/1983 Chimienti et al. ............. 710/264
4,630,041 A * 12/1986 Casamatta et al. ............ 710/260

(Continued)

FOREIGN PATENT DOCUMENTS

CN    1367432 A    9/2002
CN    1409575 A    4/2003

(Continued)

OTHER PUBLICATIONS

Beckmann, et al., "Designing Efficient, Realtime Audio Systems With Visual Audio," Dataweek Electronics & Communications Technology, Feb. 9, 2005, www.technews.co.za.

(Continued)

*Primary Examiner* — Tanh Nguyen
(74) *Attorney, Agent, or Firm* — Bruce Greenhaus; Richard Bachand; Duane Morris LLP

(57) ABSTRACT

An audio-video (AV) playback chain and rendering peripheral device 300 for generating two or more interrupts 306, 308 with a programmable delay 304 between them. Such are configured to prevent two processors 310, 314 from racing to access the same system resources in their respective interrupt service routines.

7 Claims, 2 Drawing Sheets

U.S. PATENT DOCUMENTS

| | | | |
|---|---|---|---|
| 5,396,633 A * | 3/1995 | Mayer et al. | 710/260 |
| 5,423,049 A * | 6/1995 | Kurihara | 710/262 |
| 5,461,679 A * | 10/1995 | Normile et al. | 382/304 |
| 5,495,615 A * | 2/1996 | Nizar et al. | 710/260 |
| 5,530,891 A * | 6/1996 | Gephardt | 710/8 |
| 5,708,817 A * | 1/1998 | Ng et al. | 710/266 |
| 5,805,870 A * | 9/1998 | Browning | 713/375 |
| 6,065,089 A | 5/2000 | Hickerson et al. | |
| 6,304,911 B1 * | 10/2001 | Brcich et al. | 709/237 |
| 6,463,486 B1 * | 10/2002 | Parry et al. | 710/52 |
| 6,922,845 B2 | 7/2005 | Yap et al. | |
| 7,292,589 B2 * | 11/2007 | Dhara | 370/401 |
| 7,865,634 B2 * | 1/2011 | Chen | 710/52 |
| 7,979,822 B2 * | 7/2011 | Nightingale et al. | 716/106 |
| 2008/0168203 A1 * | 7/2008 | Nageswaran et al. | 710/264 |
| 2008/0317119 A1 * | 12/2008 | Bhattacharya | 375/240.01 |

FOREIGN PATENT DOCUMENTS

| | | | |
|---|---|---|---|
| CN | 1549968 A | | 11/2004 |
| EP | 0442716 | | 8/1991 |
| EP | 0806730 A2 | | 11/1997 |
| JP | 59-100926 | * | 6/1984 |
| JP | 4308955 A | | 10/1992 |
| JP | 11015800 A | | 1/1999 |
| WO | 03/021438 A1 | | 3/2003 |

OTHER PUBLICATIONS

Katz, et al., "Embedded Multimedia—Choosing Between a Dual or a Single Core Media Processor," Design & Reuse, Aug. 3, 2005, www.embedded.com.

PCT International Preliminary Examination Report dated Jun. 24, 2008 corresponding to the related PCT Patent Application No. IB2006/55012.

* cited by examiner

AV RENDERER PERIPHERAL WITH DUAL INERRUPT LINES FOR STAGGERED INTERRUPTS

FIELD

The present invention relates to audio-video (AV) playback chains and rendering peripheral devices, and more particularly to methods and circuits for generating two or more interrupts with a programmable delay between them to prevent two processors from racing to access the same resources in their respective interrupt service routines.

BACKGROUND

The Sarnoff (Princeton, N.J.) DVD Audio/Video Decoder accepts unscrambled DVD Streams, MPEG-1 System Streams, or MPEG-2 Program Streams, decodes the audio and video payloads, and automatically synchronizes the decoded audio and video outputs without requiring host software intervention. It also accepts and decodes sequences of audio and video PES packets, for use with external Digital Broadcast System (DBS) transport stream demultiplexers. The system processor is designed to operate with a minimum of 4 Mbytes of external SDRAM. It supports an input data rate of 64 MBits/sec and a video bit rate of 15 MBits/sec. The host initializes the decoder by resetting it and configuring the desired audio and video options. During operation, the decoder issues interrupts to notify the host that video user data, audio ancillary data, or system-level PSI data are available for retrieval from SDRAM, that specific data buffers are empty or full, or that bitstream errors have been detected. The host reads an interrupt status register to determine the nature of each interrupt.

Audio-video (AV) playback chains are often split up to be processed by more than one processor. So it is important for the peripheral devices to provide periodic interrupts and to be accessible by all these processors. If such access to the renderer peripheral is through common memory-mapped input-out (MMIO) registers, then the renderer peripheral access to the processor directly controlling it should be staggered with the other processors to avoid race conditions and stalls.

Conventional circuits and methods provide only one hardwired interrupt output from the AV renderer peripheral. The processors assigned to service the interrupt with their interrupt service routine (ISR) software can race each other to the single interrupt. Even processors that are not triggered by hardwired interrupts to service AV renderer peripheral can nevertheless get into races and collide causing stalls.

SUMMARY

What is needed, and what has been missed so far, is an AV renderer peripheral that can issue multiple lines of interrupts to non-simultaneously involve more than one independent processor.

This invention provides a circuit for an audio-video renderer peripheral device with multiple interrupt outputs.

Briefly, a circuit embodiment of the present invention comprises an audio-video renderer peripheral device with two processor interrupt outputs. A heartbeat interrupt output is a primary one, while a second interrupt output can be programmed to follow the primary heartbeat interrupt by a variable time delay.

An advantage of the present invention is that a circuit and method are provided to ensure multiple processors will be able to meet their respective processing deadlines for an audio-video renderer peripheral device.

Another advantage of the present invention is that a circuit and method are provided that allow virtual-renderers to be implemented in software by processors not having direct access to an audio-video renderer peripheral device.

A further advantage of the present invention is that time-stamp translation schemes can be used to convert presentation time stamps from the source clock domain to the renderer clock domain when the renderer clock is accessible via registers.

These and other objects and advantages of the present invention will no doubt become obvious to those of ordinary skill in the art after having read the following detailed description of the preferred embodiments which are illustrated in the various drawing figures.

DETAILED DESCRIPTION

Figure 1:
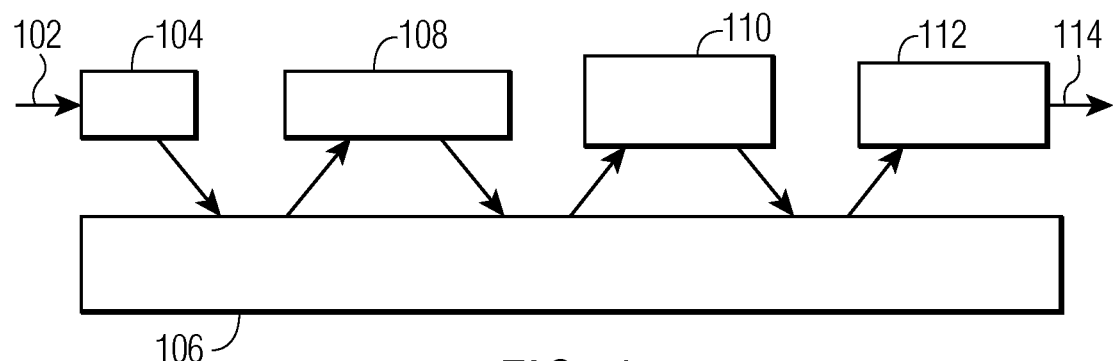
FIG. 1 is a functional block diagram of an audio-video playback chain embodiment of the present invention.

FIG. 1 represents the dataflow for an audio-video (AV) playback chain embodiment of the present invention, and is referred to herein by the general reference numeral 100. AV playback chain 100 comprises an AV source 102 that is selected by a tuner 104. It deposits a datastream in a memory 106. A stream decoder 108 recovers the original data, and puts the decoded data in memory 106. An AV post-processor 110 operates on the decoded data, and places its output in memory 106. An AV-renderer 112 outputs AV-presentations 114 for a user.

The Philips TriMedia Streaming Software Architecture (TSSA) is an example of an implementation similar to FIG. 1. The audio system for a television receiver is constructed within TSSA and is optimized for streaming multimedia data. Software modules are represented by tuner 104, stream decoder 108, AV post-processor 110, and AV-renderer 112. The software modules can be developed independently because the interfaces are clearly defined between components. A programmer integrate diverse modules as they connect in a common way. Many TSSA components are commercially available to build a complete Advanced Television System Committee (ATSC) receiver. TSSA uses a data-driven design. The real-time operating system (RTOS) provides a foundation that allows the system to be factored into independent tasks that communicate using queues, pointers, and semaphores that are passed by interrupts. A given task will sleep until data is available, process the data, send it along, and sleep again. The connection between tasks is implemented using an operating system's queue construct. Each connection is made up of a pair of queues, with packets full of data carried in one queue, and empty packets in the other. The empty packets signal to the sender that the associated data memory can be recycled. The number of packets that circulate in this pair of queues determines the amount of buffering between the two tasks. Data passes between tasks in packets, and packets use a standard structure defined by the architecture. Packets are passed by reference, so that data is not copied unnecessarily. Packets may also be time stamped to facilitate synchronization. These data packets may pass audio, video, and other data.

Most of the interactions between processors and AV-renderer peripherals occur in the context of a renderer heartbeat interrupt service routine (ISR). The heartbeat periodic interrupt conventionally signals the completion of rendering of an AV data buffer. It triggers a next data transfer to the AV renderer, and subsequent data processing upstream. If two or more processors are connected to the same AV-renderer interrupt line, racing and temporary execution lock-up can occur.

Embodiments of the present invention provide at least a second interrupt line from the AV-renderer peripheral. In one instance, a second interrupt output is skewed by a fixed programmable time interval relative to a primary heartbeat interrupt.

Figure 2:
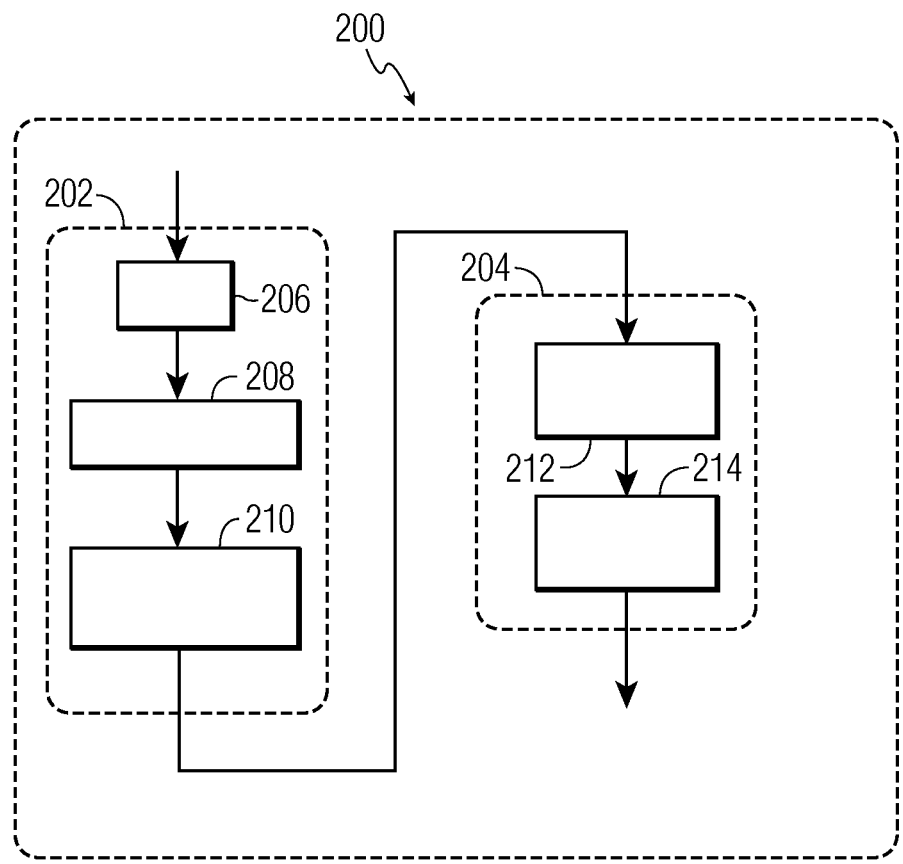
FIG. 2 is a functional block diagram of a system-on-chip implementation with two core processors divided for AV decoding and rendering.

FIG. 2 represents a system-on-chip (SoC) embodiment of the present invention, and is referred to herein by the general reference numeral 200. The SoC 200 uses at least two core processors (processor-1) 202 and (processor-2) 204 to implement audio-video (AV) playback chain. Processor-1 202 includes a tuner 206, a stream decoder 208, and a virtual AV renderer 210. Processor-2 204 has an AV post-processor 212 and an AV renderer 214.

For AV playback systems, it is common to transfer data between processors via shared memory at regular intervals equal to that of the rendering heartbeat. At the same time, the data transfer itself must be staggered with regard to the renderer interrupt so that any further processing via software can be accomplished prior to rendering. If the renderer clock domain is distinct from the decoder clock domain, any presentation time stamp (PTS) values from the stream decoder should be translated into a corresponding PTS value for the renderer. The PTS translation process typically needs access to a renderer clock.

For example, SoC 200 could be part of a system-on-chip like the Philips (Amsterdam, The Netherlands) Nexperia™ PNX8550 home entertainment engine. Such is a highly integrated SoC incorporating a control processor, two programmable media processors, high definition video decoders, a scaler, renderer and numerous other on-chip functions. The SoC supports analog and digital TV broadcast standards, deinterlacing and other picture improvement features, and multi-format audio/video decoding and rendering and other advanced features. A TV based on the Philips SoC can decode and display digital photographs, MPEG-4 and DV video clips directly from a flash memory card or Memory Stick. Dedicated MPEG-2 decoders can process up to two high definition program streams simultaneously for simultaneous display on the screen, e.g., picture-in-picture or side-by-side. Or they can be used to convert an HD video program for recording on a standard definition recorder.

Most of the interactions between a processor and an AV renderer peripheral occur in the context of what is commonly termed as the renderer heartbeat ISR (interrupt service routine) context. The heartbeat periodic interrupt signals the end of rendering of an AV data buffer, and thereby triggers further data transfer to the AV renderer, and consequently, further data processing upstream. If two or more processors are connected to the AV renderer interrupt line, however, the problems previously mentioned crop up.

Figure 3:
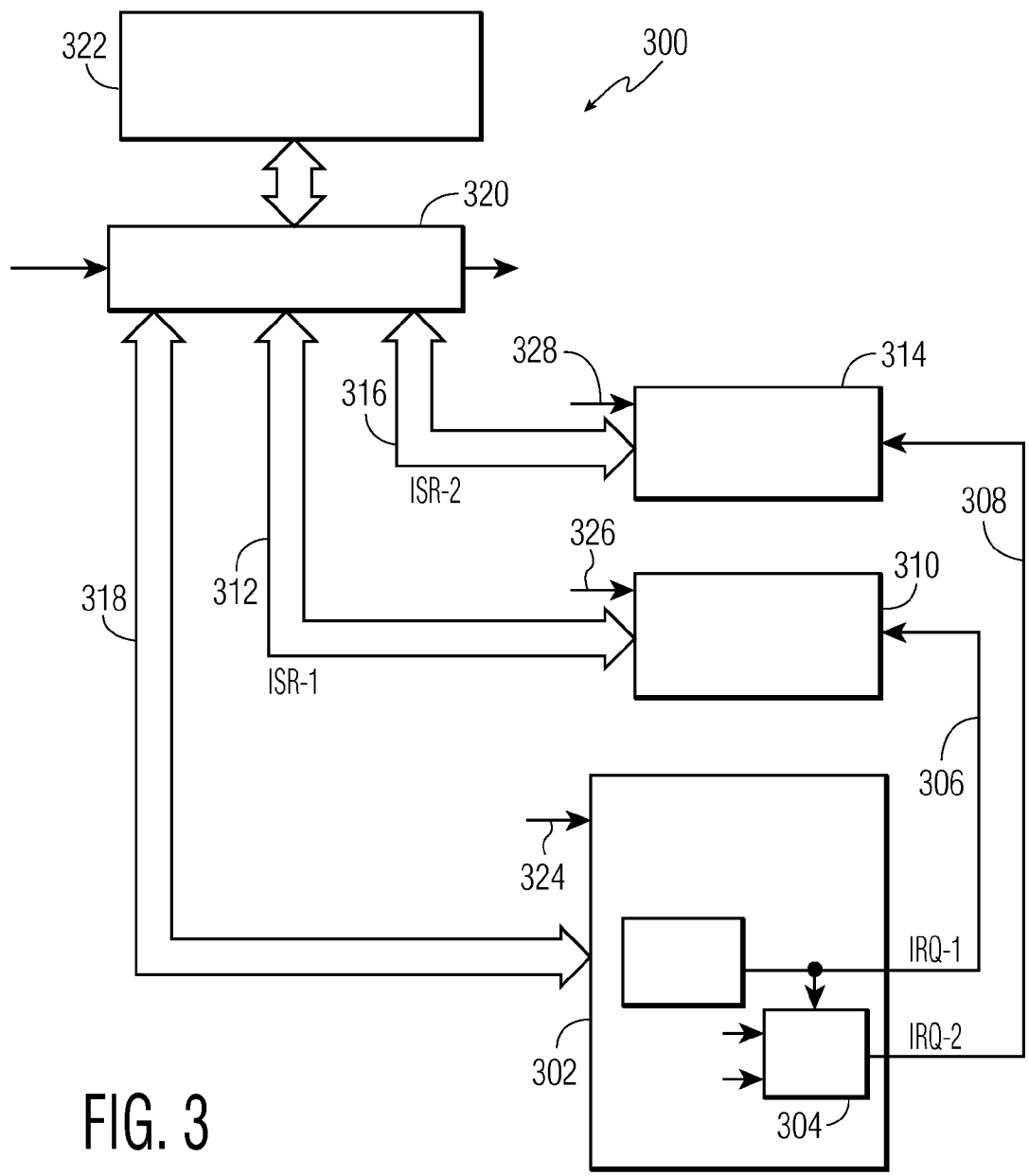
FIG. 3 is a functional block diagram of an AV-rendering system embodiment of the present invention.

FIG. 3 represents an AV-rendering system embodiment of the present invention, and is referred to herein by the general reference numeral 300. System 300 comprises an AV renderer peripheral 302 with a programmable interrupt delay timer 304. A register inside the programmable interrupt delay timer 304 can be used, e.g., to count clock ticks or data bytes remaining in an AV-data buffer.

A first interrupt request (IRQ-1) 306 triggers the programmable interrupt delay timer 304 to produce a second interrupt request (IRQ-2) 308. This allows a first core processor 310 to execute a first interrupt service routine (ISR-1) access 312. After a fixed time, a second core processor 314 is triggered by IRQ-2 308 to produce a second interrupt service routine (ISR-2) access 316. All these accesses, and direct AV-data peripheral accesses 318 must funnel through a memory-mapped input-output (MMIO) register 320. An external memory 322, e.g., SDRAM, provides storage for the video and audio programs.

Figure 4:
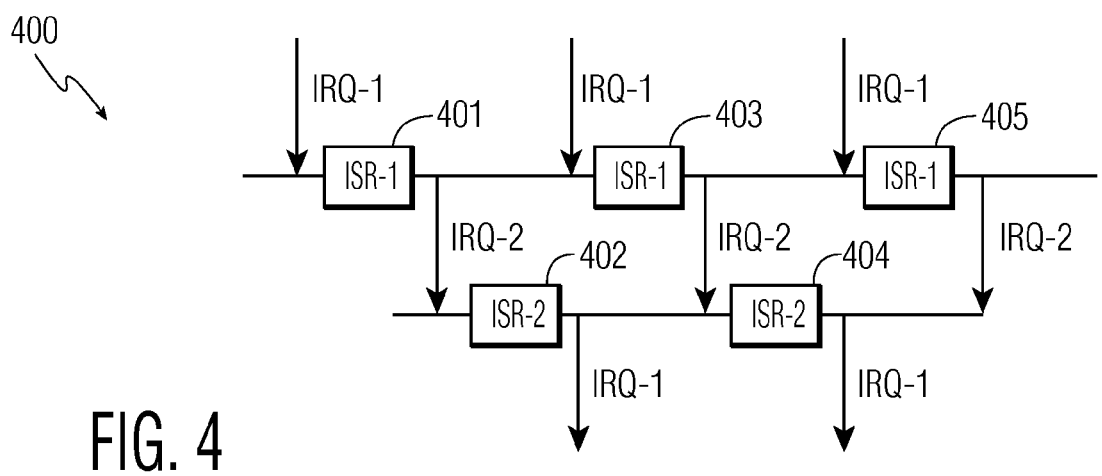
FIG. 4 is a graph showing the relative timing between ISR-1, ISR-2, IRQ-1, and IRQ-2, and to illustrate how races and stalls causes by collisions at the MMIO are avoided by interlacing memory accesses.

FIG. 4 illustrates how the special construction of AV-rendering system 300 helps avoid race conditions and stalls. If stream decoding were assigned to be done by processor-1 310 in its ISR-1 accesses 312, and post-processing and rendering were assigned to be done by processor-2 314 in its ISR-2 accesses 316, then FIG. 4 shows how these accesses would interleave through MMIO register 320. A first ISR-1 401 is triggered by IRQ-1. After enough time to execute ISR-1 401 has passed, the programmable delay timer 304 issues IRQ-2. Then ISR-2 begins 402,404. The AV-renderer peripheral will then issue a subsequent IRQ-1, and the interlaced ISR accesses continue 403, 405.

IRQ-1 306 can be used to signal to processor-1 310 that a portion of an AV-data buffer currently being rendered has been used. IRQ-2 308 can be used to signal processor-2 314 that the AV-data buffer has been completely emptied. This implies that the IRQ-1 interrupt leads the IRQ-2 by a definite interval. Such interval is programmable for clock ticks or in buffer bytes emptied, e.g., through a register setting in the AV renderer peripheral.

Embodiments of the present invention simplify SoC implementations of embedded audio-video playback chains with software modules executing on different processors. For example, the audio/video stream decoder processing and effects processing can be divided between two core processors. The benefits of the present invention accrue to both audio and video rendering hardware.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system for use in an audio-video (AV) playback chain, comprising:

an AV renderer peripheral for processing an input datastream;

a first interrupt service request output at a first interrupt line to be generated by a predetermined event occurring in the AV renderer peripheral, and providing for a first processor to begin a first interrupt service routine to service a first task for the AV renderer peripheral;

a second interrupt service request output providing for a second processor to begin a second interrupt service routine to service a second task for the AV renderer peripheral; and a programmable delay timer configured to be triggered by the first interrupt service request output and to generate the second interrupt service request output at a second interrupt line after a delay relative to the first interrupt service request output, wherein the delay depends on a programmed register value.

2. The system of claim 1, wherein: the programmable delay timer uses the programmed register value to count down peripheral clock ticks.

3. The system of claim 1, wherein: the programmable delay timer uses the programmed register value to count down bytes in an AV-data buffer.

4. A method of AV-rendering in a system-on-chip (SoC) with at least two processor cores, comprising:
   causing a first interrupt service request at a first interrupt line to be generated by a predetermined event occurring in an AV renderer peripheral, the first interrupt service request configured to trigger a first processor to begin a first interrupt service routine to service a first task for said AV renderer; and
   timing a second interrupt service request at a second interrupt line to a second processor to begin a second interrupt service routine to service a second task for said AV renderer peripheral with a delay relative to the first interrupt service request; wherein the delay depends on a programmed register value; wherein race conditions are controlled and limited by the delay.

5. The method of claim 4, further comprising: dividing the tasks of tuning, decoding, post-processing, and rendering between said first and second processors.

6. The method of claim 4, wherein: the timing provides for an interleaving of accesses from said first and second processors through a MMIO register structure to memory.

7. A system-on-chip (SoC), comprising:
   a first core processor providing for execution of a first interrupt service routine;
   a second core processor providing for execution of a second interrupt service routine; and
   an AV renderer peripheral providing for management of the first and second processors with:
      a first interrupt service request at a first interrupt line generated by a predetermined event occurring in the AV renderer peripheral, the first interrupt service request configured to trigger the first processor to begin executing said first interrupt service routine wherein said first interrupt service routine is configured to service a first task for said AV renderer peripheral, and
      a second interrupt service request, at a second interrupt line, to the second processor to begin said second interrupt service routine wherein said second interrupt service routine is configured to service a second task for the AV renderer peripheral, wherein the second interrupt service request is generated after a delay relative to the first interrupt service request, wherein the delay depends on a programmed register value.

* * * * *